3,223,753
PHOSPHONODITHIOIC ACID ESTERS
Karoly Szabo, Pleasantville, N.Y., assignor to Stauffer Chemical Company, New York, N.Y., a corporation of Delaware
No Drawing. Filed Oct. 9, 1962, Ser. No. 229,470
4 Claims. (Cl. 260—928)

This invention relates to organophosphorus compounds and in particular to bisorganophosphorus esters of phosphonodithioic acid. The invention also pertains to a method of producing such esters.

The organophosphorus compounds contemplated by the present invention can be illustrated by means of the following general formula:

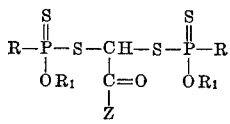

wherein R and $R_1$ may be lower alkyl radicals, e.g. methyl, chloromethyl, bromomethyl, chloroethyl, isopropyl, n-butyl, sec.-butyl, isobutyl, and the like, and Z designates lower alkoxy, e.g. methoxy, ethoxy, n-propoxy, tert.-butoxy, n-butoxy, etc., amino and lower alkylated amino, e.g. methylamino, dimethylamino, diethylamino, n-butylamino, dibutylamino, etc.

As is evident from an inspection of the formula two phosphonodithioic acid residues are linked to the alpha carbon atom of an acetyl residue as represented by acetamide or an acetic ester. Individual compounds included in the general configuration are set forth in the list below:

(1) 2,2-bis(O-ethyl ethylphosphonodithioyl) acetamide
(2) 2,2-bis(O-ethyl ethylphosphonodithioyl) acetic acid ethyl ester
(3) 2,2-bis(O-ethyl ethylphosphonodithioyl) N,N-diisopropyl acetamide
(4) 2,2-bis(O-ethyl methylphosphonodithioyl) acetic acid methyl ester
(5) 2,2-bis(O-ethyl ethylphosphonodithioyl) N,N-diethyl-acetamide
(6) 2,2-bis(O-ethyl ethylphosphonodithioyl) N-ethylacetamide
(7) 2,2-bis(O-n-butyl ethylphosphonodithioyl) acetamide
(8) 2,2-bis(O-isopropyl methylphosphonodithioyl) acetic acid ethyl ester
(9) 2,2-bis(O-ethyl ethylphosphonodithioyl) N-methylacetamide
(10) 2,2-bis(O-ethyl n-butylphosphonodithioyl) N-n-butylacetamide The bisorgano esters of this invention can be realized by a generalized method of preparation which comprises condensing, preferably in the presence of a basic condensing agent, about 1 mole of a 2,2-dihalo acetyl component as exemplified by 2,2-dihaloacetamide or 2,2-dihalo acetic ester, with about 2 moles of a lower O-alkyl alkylphosphonodithioic acid. The following chemical equation represents a schematic depiction of the course of the reaction:

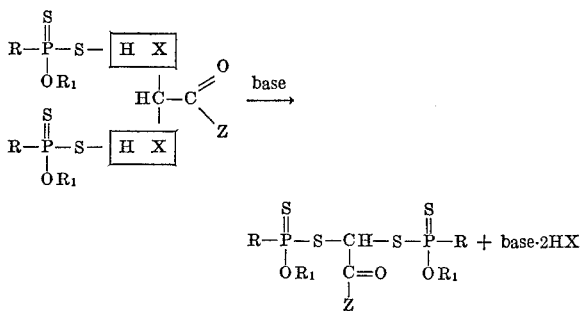

wherein X signifies halogen, preferably chlorine or bromine, Z, R and $R_1$ have the values as previously defined. It has been found that excellent results are achieved by refluxing the lower O-alkyl alkylphosphonodithioic acid and the halogenated acetyl component in a relatively inert normally liquid organic solvent in the presence of the basic condensing agent, the purpose of which is to bind the halogen acid which is eliminated during the course of the reaction. Suitable solvent mediums are exemplified by liquid aromatic hydrocarbons such as benzene, toluene, xylene, etc., saturated aliphatic hydrocarbons, such as hexane, heptane, cyclohexane, etc., saturated aliphatic ethers, as well as the liquid derivatives of the aforenamed hydrocarbons. Basic condensing agents which have been found satisfactory for effecting the reaction include the basic organic amines, preferably tertiary amines as represented by the lower alkylamines, e.g. trimethylamine, triethylamine, etc., tertiary heterocyclic amines such as pyridine, picoline, etc., inorganic bases and basic salts, e.g. alkali metal carbonates, sodium carbonate, potassium carbonate, and the like, alkali metal hydroxides, lithium hydroxide, potassium hydroxide, sodium hydroxide, etc. In some instances, it has been found advantageous to conduct the reaction in a medium capable of functioning both as a solvent and as a basic condensing agent, and in this connection such basic solvents as pyridine and quinoline have proven exceptionally effective.

Reference is now made to the following examples which are presented for the purpose of illustration only since variations in practicing the invention without departing from the scope and spirit thereof will be apparent to those skilled in the art to which the said invention pertains.

EXAMPLE 1

2,2-bis(O-ethyl ethylphosphonodithioyl)acetamide 17.0 g. (0.1 mole) of O-ethyl ethylphosphonodithioic acid, 6.4 g. (0.05 mole) of 2,2-dichloroacetamide and 100 ml. of benzene were placed in a reaction flask after which 10.1 g. (0.1 mole) of triethylamine was added while maintaining thorough stirring. The introduction of the organic base caused a moderate exothermic reaction and the temperatures rose to 55° C. After refluxing for 1.5 hours, the reaction mixture was filtered to remove the triethylamine hydrochloride and the filtrate distilled in vacuo to remove the solvent and volatile components. The tan, waxy residue was purified by crystallization from a mixture of hexane and toluene. The purified product melted at 94° C.

EXAMPLE 2

2,2-bis(O-ethyl ethylphosphonodithioyl)
N,N-diethylacetamide

This compound was prepared following the procedure of Example 1 by using 2,2-dichloro-N,N-diethylacetamide in place of the 2,2-dichloroacetamide of the first example. The product in this instance was a brownish oil, the refractive index of which was 1.5471 at 23° C. Chemical analysis indicated the product to be the above named compound. The toxicant of this example was 100% lethal to house flies when applied at the rate of 100 μg. per insect.

EXAMPLE 3

2,2-bis(O-ethyl ethylphosphonodithioyl)
N-methylacetamide

This compound was prepared in accordance with the procedure of the previous example but using 2,2-dichloro-N-methylacetamide. The product obtained in this example was found by chemical analysis to correspond to the above named structure. The yield of purified material amounted to 75%.

EXAMPLE 4

*2,2-bis(O-ethyl ethylphosphonodithioyl) acetic acid ethyl ester*

This compound was prepared in accordance with the procedure of Example 1 but substituting dichloro acetic acid ethyl ester for the 2,2-dichloroacetamide of the first example. The result and yield generally paralleled those of the other examples.

It has been ascertained that the bisorganophosphorus esters of this invention are characterized by a remarkable degree of biocidal activity being especially useful for controlling pest organisms falling within the lower order of classification such as mites, insects, and the like. For instance, compound 9 exhibits high toxicity toward beetles and in the case of *Tribolium confusum* gave an LD-50 value of 10 μg. per insect. Compound 1 also exhibits excellent activity and was 100% effective in controlling mites at concentrations in the neighborhood of 0.05%, the toxicity extending to the eggs as well as the adult organisms. Toxicity of a comparable degree is displaced by the other organophosphorus compounds of the invention.

As those in the art are aware, various techniques are available for incorporating the active component or toxicant in suitable pesticidal compositions. Thus, pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cotton seed and so forth.

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicants in an aqueous media and such compositions may be produced by forming a concentrated solution of the toxicant in a suitable organic solvent followed by dispersion in water, usually with the aid of surface active agents. The latter, which may be the anionic, cationic or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, fatty alcohol ethers, polyglycol fatty acid esters and other polyoxyethylene surface active agents. The proportion of these agents commonly comprises 1–15% by weight of the pesticidal compositions although the proportion is not critical and may be varied to suit any particular situation.

Other adjuncts may be resorted to in compounding biocidal formulations based on the herein described organophosphorus esters and, in this connection reference is made to adhesives, spreaders, activators, fertilizers and the like.

I claim:

1. A bisorganophosphorus ester of the general formula:

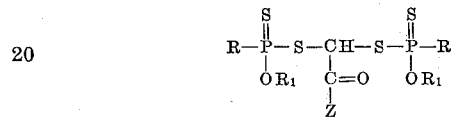

wherein R and $R_1$ represent lower alkyl radicals and Z is selected from the class consisting of lower alkoxy, amino and lower alkylated amino.

2. 2,2-bis(O-ethyl ethylphosphonodithioyl) acetamide.

3. 2,2 - bis(O-ethyl ethylphosphonodithioyl) N,N - diethylacetamide.

4. 2,2 - bis(O-ethyl ethylphosphonodithioyl) N - methylacetamide.

References Cited by the Examiner

UNITED STATES PATENTS

| | | | |
|---|---|---|---|
| 2,873,228 | 2/1959 | Willard et al. | 260—461 |
| 2,877,152 | 3/1959 | Willard et al. | 260—461 |
| 2,916,415 | 12/1959 | Willard et al. | 260—461 |
| 2,941,920 | 6/1960 | Willard et al. | 260—461 |
| 3,042,700 | 7/1962 | Birum | 260—461 |
| 3,058,876 | 10/1962 | Birum | 260—461 |
| 3,059,017 | 10/1962 | Dever et al. | 260—461 |

OTHER REFERENCES

Kabachnik et al.: "Zhur, Obshchei Khim.," vol. 28, No. 6, pages 1568–1573 (1958).

CHARLES B, PARKER, *Primary Examiner.*

IRVING MARCUS, *Examiner.*